United States Patent [19]

Klausner et al.

[11] 4,304,968

[45] Dec. 8, 1981

[54] TELEPHONE ELECTRONIC ANSWERING DEVICE

[75] Inventors: Judah Klausner; Robert Hotto, both of New York, N.Y.

[73] Assignee: Klausner Industries, New York, N.Y.

[21] Appl. No.: 78,207

[22] Filed: Sep. 24, 1979

[51] Int. Cl.³ .......................................... H04M 11/10
[52] U.S. Cl. .................................... 179/6.02; 179/6.03; 179/6.07; 179/5.5; 179/90 K; 179/90 AN
[58] Field of Search ............... 364/705, 900 MS File; 179/6 R, 6 TA, 6 D, 6 AC, 6 E, 90 K, 90 AN, 5.5, 6.02, 6.07, 6.12, 6.03

[56] References Cited

U.S. PATENT DOCUMENTS

| | | | |
|---|---|---|---|
| 3,644,675 | 2/1972 | Watlington | 179/6.R |
| 3,686,440 | 8/1972 | Kroeger | 179/90 AN |
| 3,725,589 | 4/1973 | Golden | 179/6 E |
| 3,787,626 | 1/1974 | Subieta | 179/90 AN |
| 3,943,526 | 3/1976 | Albertini | 179/6 E |
| 3,953,680 | 4/1976 | Zimmermann | 179/6 R |
| 3,995,123 | 11/1976 | Wilson | 364/705 |
| 4,071,699 | 1/1978 | Jovic | 179/5.5 |
| 4,117,542 | 9/1978 | Klausner | 364/900 |

Primary Examiner—Alan Faber
Attorney, Agent, or Firm—Parmelee, Johnson, Bollinger & Bramblett

[57] ABSTRACT

A telephone electronic answering device (TEAD), interfaced to the standard telephone mechanism, resembles a pocket calculator in size and shape and receives and records messages sent to it from a caller's telephone. It receives either dual tone frequencies or rotary dial pulses fed from the caller's telephone, converts such signals into the caller's telephone number, searches for the caller's name indicated by the same phone number stored in memory and records the caller's name, telephone number and time of call in memory. The TEAD comprises a case containing telephone signal conversion means for converting dual tone frequencies or rotary dial pulses into phone numbers, memory circuit means for storing a list of phone numbers with their respective names, additional memory circuit means for recording messages consisting of such phone numbers, names and times of messages, read only memory circuit means for programming the operation of the instrument, microprocessor circuit means for controlling the operation of the circuitry and timekeeping means for noting the time at which telephone signals are received by the unit. An alphanumeric display means having a capacity of 10 and preferably at least 12 letters or numbers is provided for displaying phone numbers and names as they are input by the user to be stored in memory list and for displaying retrieved recorded messages sequentially. A keyboard on the case of the TEAD comprises alphanumeric keys for numerals 1 through 10 and letters A through Z together with function keys.

20 Claims, 13 Drawing Figures

OPTO ISOLATED DIGITAL OUTPUT
TELEPHONE RING DETECTOR — 22A

LINE SEIZING RELAY CIRCUIT 22C

TOUCH TONE FREQUENCY DECODER

Fig. 7. LISTING NAMES AND PHONE NUMBERS

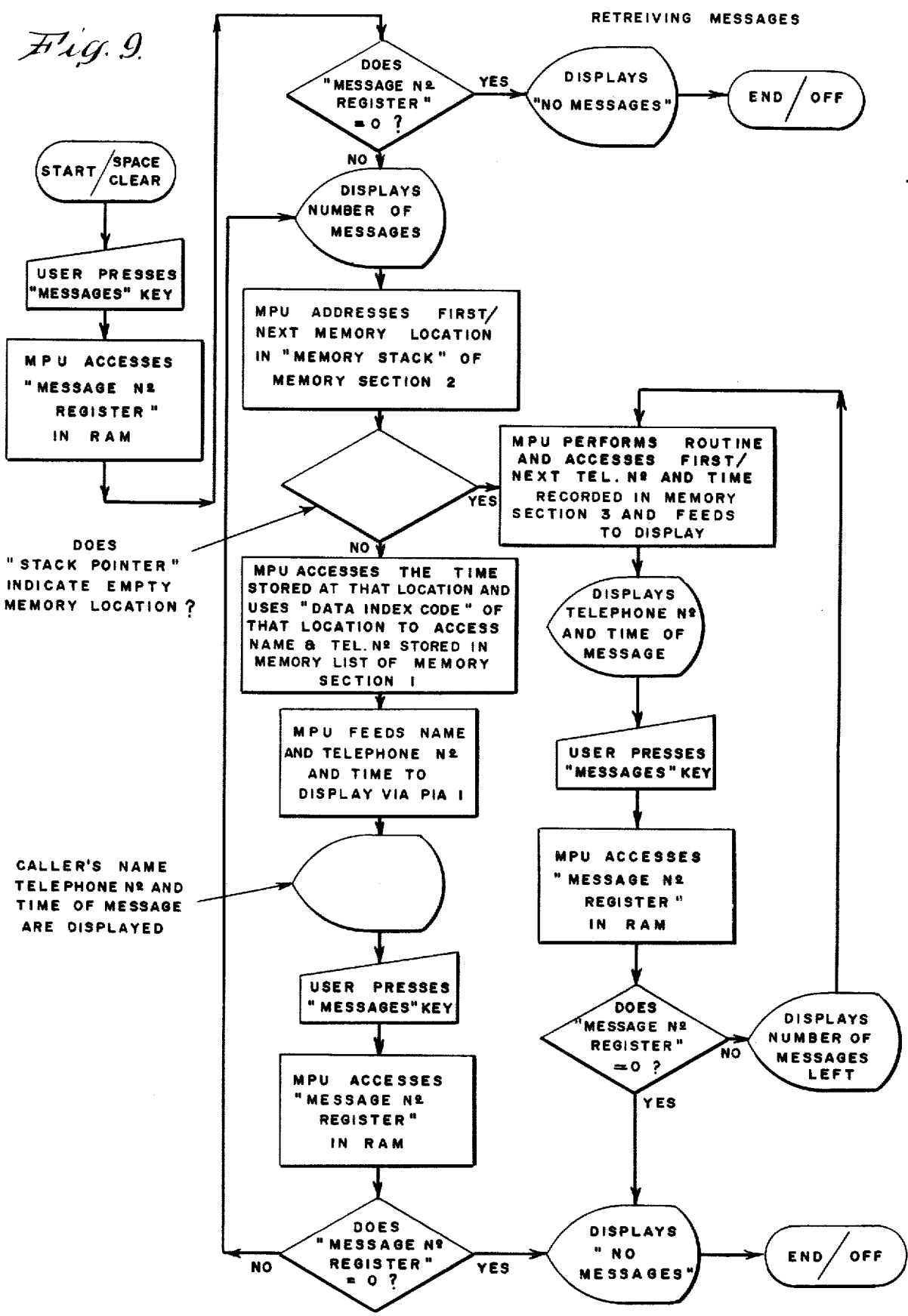

TELEPHONE ELECTRONIC ANSWERING DEVICE

FIELD OF INVENTION

The present invention relates to a microcomputer telephone answering device, herein called a "Telephone Electronic Answering Device" (TEAD), which receives and records messages sent to it from a caller's phone by receiving the dual tone frequencies or rotary dial pulses generated by the caller dialling his own phone number and converting such signals into the caller's phone number. It searches for the name stored by the user under that phone number and records a message comprising the converted phone number, the indicated name and the registered time of call. The messages are displayed by means of an alphanumeric display and are retrieved by means of function keys.

BACKGROUND OF THE INVENTION

Most everyone is well acquainted with the standard telephone answering machine. Such a machine is hooked up to a telephone and by means of a tape recorder device and magnetic tape it records oral messages from the caller. While such a machine has the advantage of allowing the user to receive messages when he is not present and cannot answer the phone, it has several disadvantages: (1) Such an answering machine may be large, usually larger than the phone itself. (2) Because of its large size, it cannot be built into the standard size telephone and must remain as a separate unit. (3) The owner of the machine must play back several minutes of tape, sometimes with periods of silence in between messages to search for recorded messages. (4) The caller must speak his name, phone number, etc. into his phone in order for the message to be transmitted through the phone system and recorded on the answering machine on the other end of the line. Since many callers feel uncomfortable speaking to machines, some callers don't leave messages and merely hang up the phone. (5) An additional inconvenience occurs when the user wishes to retrieve stored messages by phone. He must on occasion wait for minutes for all recorded messages to be played and must copy with pen and paper in order to have a hard copy.

SUMMARY OF THE INVENTION

It is an object of this invention to provide a telephone electronic answering device of a size and shape resembling a pocket calculator, that receives and stores messages including callers' names and telephone numbers and times of receipt of such messages by converting dual tone-touch tone frequencies or rotary dial pulses, generated by the caller dialling his own phone number, into proper digital data representing the caller's phone number and indicating the caller's name if stored in memory circuit means by the user. The entire message is retrieved and displayed on command on the display means provided on the face of the instrument and/or may be printed out to provide a permanent record.

Another object of this invention is to provide an electronic telephone answering device which is so conveniently configured that it may be integrally incorporated in the telephone handset.

In carrying out this invention in one illustrative embodiment thereof, a telephone electronic answering device (TEAD) is provided having a plurality of memory sections which is coupled to a telephone line among with a telephone instrument. A predetermined list of telephone numbers with the names of the persons are stored in digital form in a first memory section of the TEAD. The TEAD is actuated and coupled directly to the telephone line by a predetermined number of telephone ringing signals and a recorded message is automatically transmitted instructing the caller to leave a message by dialling his own telephone number. The caller's transmitted number is converted into digital form and compared with the list. If the dialled number is on the list, the name of the caller, number and time are stored in a second memory section and if the number is not on the list, the number and time are stored in a third memory section. All the messages stored in memory may be sequentially retrieved either locally or remotely.

The apparatus for performing the above method and functions includes a microprocessor having a read only memory (ROM), a random access memory (RAM) and suitable peripheral interface means for coupling such peripherals as a keyboard, alphanumeric display and a printer to the microcomputer. The RAM contains a plurality of memory sections. A first memory section controlled by the keyboard is suitable for storing over 100 names and corresponding telephone numbers. Additional memory sections are provided for storing information with respect to incoming calls. Analogue telephone interface means are provided which include a line seizing means for connecting the TEAD to a telephone line following a predetermined number of ringing signals and an audio recording means which instructs the caller to dial his own telephone number. Telephone signal converter means are provided to convert incoming touch-tone frequencies or dial pulses into suitable digital form for use by the microcomputer. The analogue telephone interface means also includes means for generating and transmitting touch-tone frequencies in accordance with stored telephone numbers in order to return calls at the user's command or to send stored messages to a remote location.

In a further aspect of the invention timekeeping means are provided to automatically record the time of incoming calls.

In a further aspect of the invention the TEAD may be provided in a separate small case resembling a pocket calculator and may be incorporated in a telephone instrument in which the keyboard of the TEAD will function in a dual capacity of dialling and controlling the microcomputer.

Advantageously, the TEAD is more convenient to use than the usual telephone answering machine. It is much smaller in size and so does not take up much added desk space, and because of its small size can easily be incorporated in a standard telephone instrument. The user receives an instant readout of all messages on the display or if a printer is used, then all messages are printed out on a roll of paper. Hence, there is no need for the user to play a tape and listen to minutes of recordings with interspaced periods of silence between recorded messages in order for him to gain access to messages, thus saving effort and time. Furthermore, many callers who feel uncomfortable speaking to machines, and hang up their phone rather than speak into the standard tape recorder answering machine will find the simplicity of only needing to press out their own phone number on their telephone much more convenient than reciting their name, phone number and time of call into the receiver. Hence, they are more apt to leave a message with the TEAD than with the standard mechanical answering machines.

Additionally, the TEAD has the advantage of allowing the user, when retrieving stored messages by telephone to do so in a manner more convenient than with the remote activation of the standard answering machine's tape player. With the use of a second TEAD, the user is able to cause all of his messages to be transferred in a matter of seconds by means of rapid audio signal feed to his second unit from his home unit. He need not wait for a tape player to play minutes of tape. The user then has a complete copy of all of his messages now stored in his second TEAD and may access each one individually at his own convenience, hence he no longer must take pen and paper to hand and copy down each individual message as the tape player speaks into the phone.

BRIEF DESCRIPTION OF THE DRAWINGS

The invention, together with further aspects, objects and advantages thereof, will be more fully understood from the following description taken in conjunction with the following drawings in which:

FIG. 9 is a flow chart illustrating the retrieval of messages.

DESCRIPTION OF THE PREFERRED EMBODIMENTS

As employed herein, the word user refers to the owner of the TEAD. The term memory section means any memory in which the material stored therein may be segregated whether the material is actually isolated in different areas or is machine separable from the same storage area.

Figure 1:
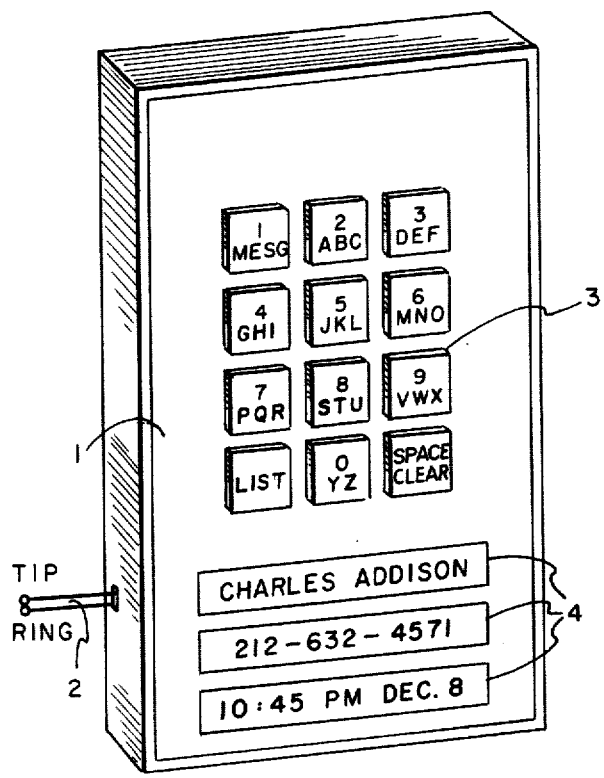
FIG. 1 is a front perspective view of a telephone electronic answering device in accordance with the present invention.

Referring now to FIG. 1 the telephone electronic answering device in accordance with the present invention comprises a case 1 having a telephone interface line 2 coupled thereto and includes a keyboard 3 and a display means 4. The case 1 is of a size and shape resembling a pocket size calculator. It contains all of the circuitry of the instrument as will be hereinafter described and is designed to accommodate the keys of the keyboard 3 and the display means 4 for which three windows are provided.

The keyboard is shown by way of example as comprising 12 keys arranged in three columns and four rows. The keys comprise alphanumeric keys and function keys. Ten of the keys bear the numerals 1-0, and of these, the keys representing 2-0 have the letters of the alphabet in a similar manner as the push-button keyboard of a telephone except that the letters Q and Z are added so as to accommodate the full 26 letter alphabet. The first key in the first row bears the letters "MESG" representing the MESSAGE key in addition to the numeral "1", the first key in the fourth row bears the word "LIST" and the third key in the fourth row bears the words "SPACE-CLEAR". All of these functions will be described below. The keys operate in the same manner as the keys of a scientific type pocket calculator which is provided with shift means so that the individual keys can perform two or more functions. Thus in the usual manner, the keys control cross connections of a grid circuit, as illustrated by way of example in FIG. 6.

The display 4 is a visual alphanumeric display which is capable of displaying information being put into the instrument and information retrieved from it. It may be similar to the displays commonly used for pocket calculators but must be capable of displaying letters as well as numbers. Thus, for example, it may be an alphanumeric display employing LED or LCD elements, a dot matrix display or a segmented display in accordance with known display techniques. The display must be capable of displaying at least 10 digits so as to display the 10 digits of a telephone number including area code and should preferably have a capacity of at least 12 digits so as to display a telephone number with proper spacing. A still larger capacity is possible and limited only by cost and the size of the instrument. Information that is being entered is displayed by the display device 4 before it is entered. As is customary in pocket calculators, the first letter or number entered by means of the keyboard appears at the right of the display. As successive digits are entered those previously entered shift progressively to the left. As illustrated by way of example in FIGS. 1 through 4, these rows of display are provided so that a message comprising a name, telephone number and time can be displayed simultaneously.

Figure 2:
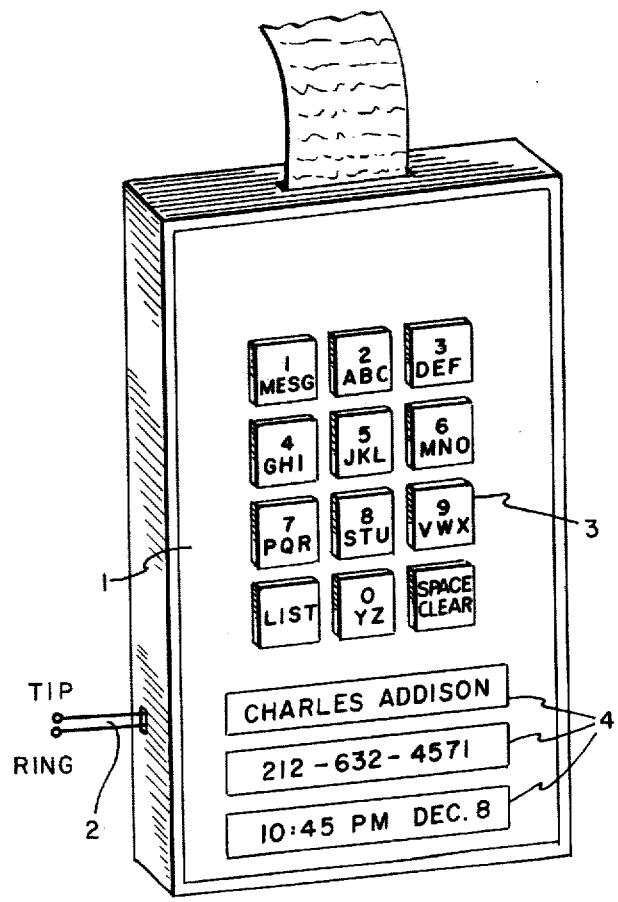
FIG. 2 is a front perspective view of a telephone electronic answering device similar to FIG. 1 having a tape print out.

In FIG. 2 there is illustrated by way of modification an instrument which is like that of FIG. 1 except that it is provided with a printer device on top of the instrument. This allows for the printing of messages as they are received by the TEAD on a roll of paper so that messages can be read by the user from one piece of paper as an alternative to reading such messages from the display sequentially.

Figure 3:
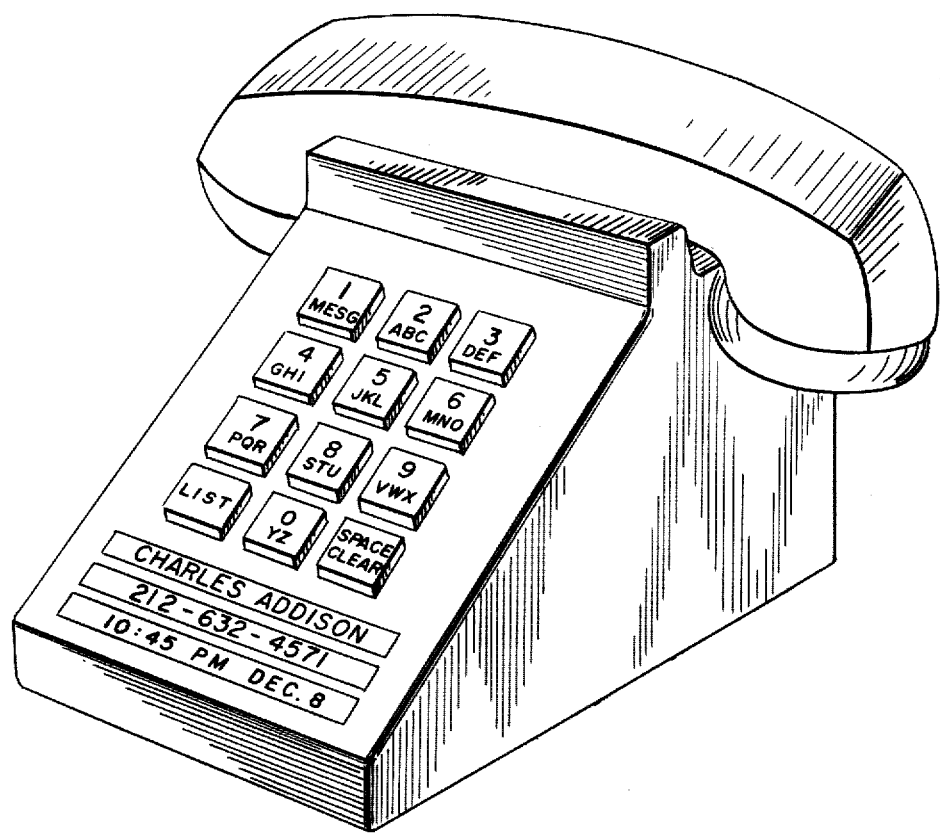
FIG. 3 is a front perspective view of a telephone electronic answering device shown in FIG. 1 incorporated in a standard telephone handset.

In FIG. 3 there is illustrated by way of modification an instrument which is like that of FIG. 1 except that it is built into a telephone handset together with the interfaced telephone and shares a common keyboard with the telephone.

Figure 4:
FIG. 4 is a front perspective view of a telephone electronic answering device shown in FIG. 2.

In FIG. 4 there is illustrated by way of modification an instrument which is like that of FIG. 1 except that it is built into a telephone handset together with the interfaced telephone, sharing a common keyboard, and is provided with a printer device for printing received messages. The printer is conventional and may, for example, be an impact matrix printer made by Datel Corp.

DESCRIPTION OF THE CIRCUITRY

Figure 5:
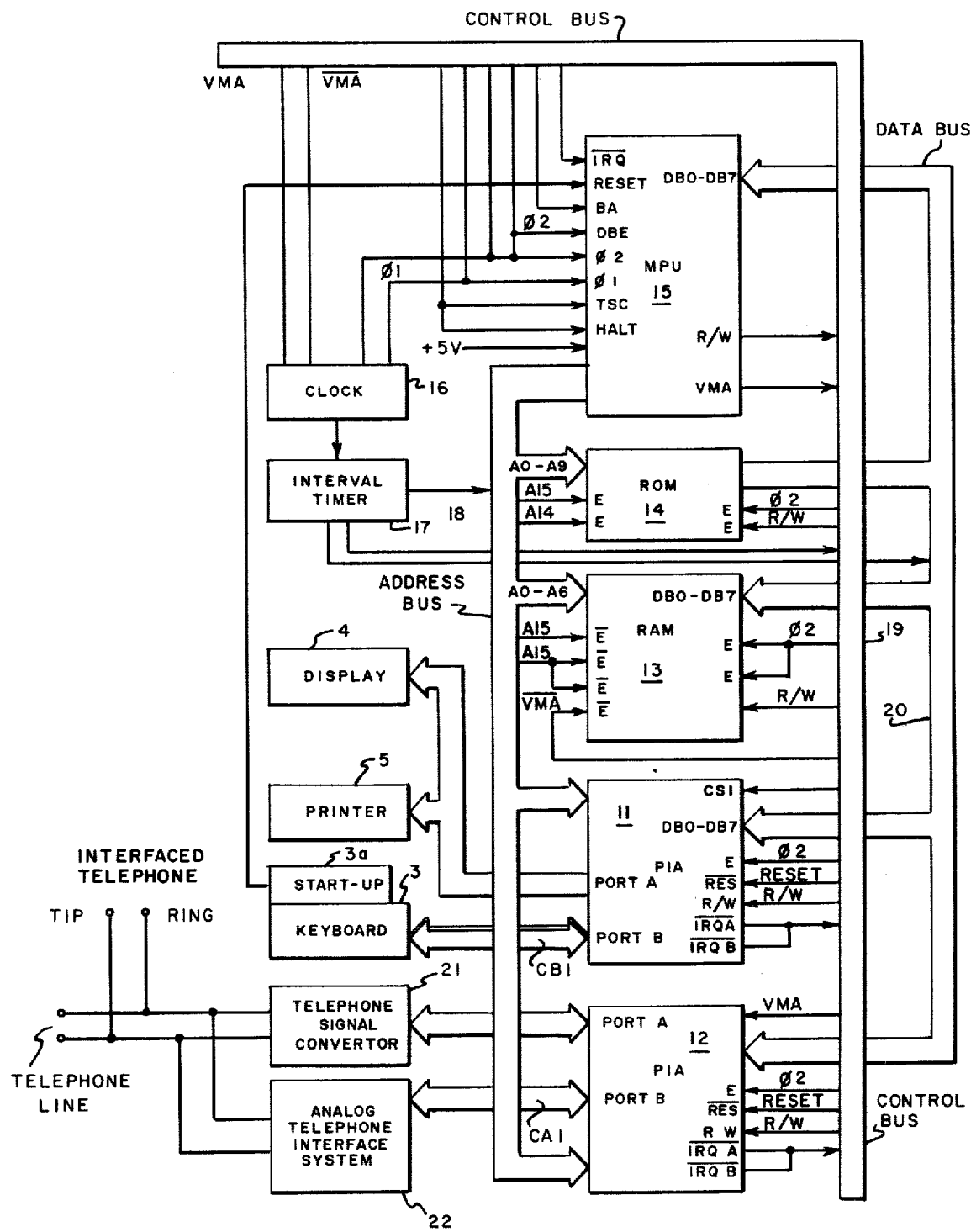
FIG. 5 is a block circuit diagram of the telephone electronic answering device.

An example of circuitry that can be employed in the TEAD, parts of which are similar to that shown and described in U.S. Pat. No. 4,117,542 issued on Sept. 26, 1978 and patent application Ser. No. 062,983 entitled "Name Dialling Telephone" filed Aug. 2, 1979, now abandoned, by the inventors of this application, is illustrated in its modified form in accordance with the present invention in FIG. 5. It will be seen that the circuitry comprises the keyboard 3, the display device 4, a first PIA (Peripheral Interface Adapter) 11, a second PIA 12, a RAM (Random Access Memory) 13, a ROM (Read Only Memory) 14, an MPU (Microprocessor Unit or 'microcomputer') 15, a clock circuit 16, an interval timer 17, a telephone signal converter 21 and an analogue telephone interface system 22. These components are interconnected by an address bus 18, control bus 19 and data bus 20 as illustrated in FIG. 5. The entire instrument is connected to the user's phone through the tip and ring telephone wires as illustrated in FIG. 5. All of the components of the circuitry are known 'off the shelf' items which are readily available and well understood by those skilled in the art.

Power is supplied to the circuitry by a regulated power supply, for example, a 5 volt power source with a regulator. If a volatile memory is used, there is a backup power supply so that power is maintained on the memory at all times even when there is a power failure.

The PIA's serve as an interface between the microcomputer system and peripherals such as the keyboard 3, the display device 4, the telephone signal converter 21 and the analogue telephone interface system 22.

The PIA's may be of the kind manufactured by Motorola Inc., Semiconductor Products Division, Phoenix, Ariz. and identified as MC6820 peripheral interface adapter. This is a device that provides a flexible method of connecting byte-oriented peripherals to the MPU. The PIA's, while relatively complex in themselves, permit the microprocessor to handle a wide variety of equipment types with minimum additional logic and simple programming. As will be seen from FIG. 5, the PIA's are connected with the peripherals and with the computer circuitry through address bus 18, control bus 19 and data bus 20.

The random access memory RAM 13 is a read-write memory device, the contents of which can be read without being destroyed. However, the contents of the RAM can be added to or modified by means of the keyboard 3 and by means of the caller's telephone keyboard.

The RAM memory media is preferably of the C-MOS type with a backup power supply such as CDP18225D manufactured by RCA (Solid State Division), Somerville, N.J. By means of C-MOS circuitry like that used in the Hewlett-Packard Hp-25C pocket calculator, the unit will retain the data no matter how often it is switched ON and OFF. However, the memory media is not limited to the C-MOS type as other memories such as charged coupled devices (CCD), magnetic bubble memories (MBM) or EPROMS can be used. These devices are available from the Texas Instruments Company.

The read only memory ROM 14 is, for example, a mask-programmable byte-organized memory designed for use in bus-organized systems. A suitable ROM is the MCM 6830A manufactured by Motorola Semiconductor Products Inc. in Phoenix, Ariz. It is fabricated with N-channel silicon-gate technology. For ease of use the device operates from a single power supply, has compatibility with TTL and DTL and needs no clocks or refreshing because of its static operation. In the read only memory ROM 14, the contents can be read but cannot be changed or altered. The data contained in the ROM is put into it during the manufacture. The system programming including the mode of operation of the microcomputer is stored in the ROM. The programming of the RAM 12 and ROM 14 is indicated by the flow charts shown in FIGS. 7 through 9 and described below.

The microcomputer MPU 15 is a binary arithmetic logic device implemented on a semiconductor chip. A microcomputer is similar to a digital computer in instruction sets, addressing modes and rates of execution. The difference between a microcomputer and a digital computer is that the digital computer is much larger and more costly and is used as a general purpose instrument. The microcomputer being much smaller and much less expensive is dedicated to particular functions. In the instrument of the present invention the function of the microcomputer is the storage of information at assigned locations as inputted from the keyboard and from the caller's telephone dial and also the retrieval of information that is requested from the keyboard. As an example of a microcomputer suitable for use in the instrument of the present invention is model 6800 microcomputer manufactured by Motorola Semiconductor Products Inc. of Phoenix, Ariz.

The clock 16 comprises a crystal oscillator circuit which provides two non-overlapping+pulses designated $\phi 1$ and $\phi 2$ which are supplied to the MPU 15 and to the control bus 19. A suitable clock circuit is Motorola Part MC6871A which is a plug-in unit that contains the crystal, the oscillator circuit, the NMOS and TTL drivers and the wave shaping and interface circuitry. It thus contains all of the components necessary to provide the critical non-overlapping 2-phase wave forms used by the Motorola MC6800MPU. A control line can be used to slow down the clock but is not necessary. The clock keeps the entire system in time and controls the sequencing of successive operations.

The interval timer 17 comprises a frequency divider. The input of the interval timer is connected to the MPU 15 and interrupts the processor after that interval. It interacts with other components through connection to the IRQ into the MPU causing the MPU to be interrupted and then resets its register and begins to process again. A suitable interval timer using a 74455 up/down counter is shown in FIG. 4-2.4-1 on page 4–46 of the Motorola MPU applications manual.

Moreover, in accordance with the present invention, the clock circuit 16 and interval timer 17 in conjunction with circuitry of the MPU 15 and RAM 13 comprise an electronic timepiece. When the SPACE-CLEAR key on the keyboard is pressed, the present time including the date is displayed by the display device 4. The clock circuit 16 serves as the usual oscillator of an electronic timepiece to produce a standard time signal. The interval timer serves as the usual frequency divider of an electronic timepiece. Circuitry of MPU 15 and RAM 13 performs the function of the usual second, minute, hour and date counters of an electronic timepiece. Thus the clock and interval timer serve the dual function of controlling operation of the system and the standard-signal providing means of the timepiece. Circuitry corresponding to memory counters and the coincidence circuit of a conventional electronic alarm timepiece are comprised in the RAM 13 and MPU 15.

The telephone signal converter 21 functions to convert incoming signals on the telephone line in form of dual tone frequencies or rotary dial pulses representing telephone numbers into appropriate digital logic understood by the computer which digitally represents the same telephone number. For purposes of this disclosure, the term dial, dialling or dialled may represent either form of transmitted signal whether from a push-button or rotary dial telephone instrument. The telephone signal converter 21 includes a touch-tone frequency decoder 21A, as illustrated by way of example in FIG. 5A, for receiving dual tone frequencies from the caller's push-button phone and for converting these frequencies into appropriate digital logic understood by the computer. An example of the frequencies used in the touch-tone system is set out below in Table A.

A suitable touch-tone decoder which may be employed is the MH88210 manufactured by the Mitel Semiconductor Corp. of Kanata, Canada. The operation of the touch-tone frequency decoder 21A will be discussed below. The telephone signal converter 21 also includes a rotary dial pulse decoder 21B, as illustrated by way of example in FIG. 5A, for converting rotary dial pulses sent from a caller's rotary dial phone. These pulses are converted into the proper digital logic understood by the microcomputer and fed to port A of PIA 11. The rotary dial pulse decoder 21B is an analogue to digital converter, operating in conjunction with a microprocessor subroutine, as illustrated by way of example in FIG. 5A. A suitable A/D converter is the NM4357B available from the National Semiconductor Co. of Santa Clara, Calif. The operation of the rotary dial pulse decoder 21B will be described below. The telephone signal converter 21 also includes an audio pickup circuit 21C whose function will be discussed below.

Figure 5A:
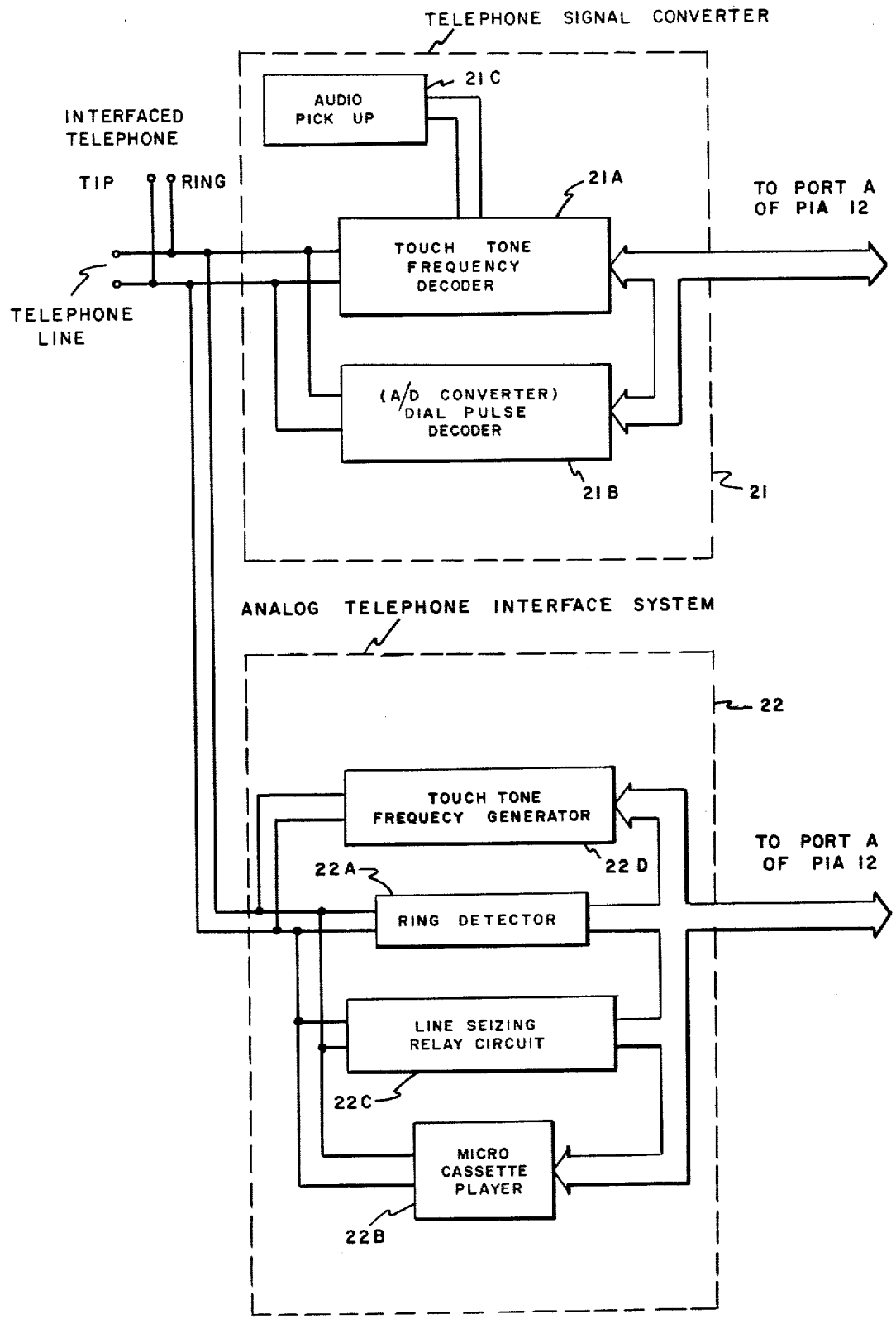
FIG. 5A is a block circuit diagram of the telephone signal converter and analogue telephone interface system which may be employed in the telephone electronic answering device of FIG. 1.

The analogue telephone interface system 22 includes ring detector 22A, a micro-cassette player 22B and a line seizing relay circuit 22C as illustrated by way of example in FIG. 5A. The analogue telephone interface system detects telephone ringing and switches the tip and ring line onto an audio circuit which provides an audio signal from the micro-cassette player 22B indicating that the caller is to leave a message by inputting his own phone number. The operation of the analogue telephone interface system 22 will be discussed below. The analogue telephone interface system also includes a touch-tone frequency generator 22D, as illustrated by way of example in FIG. 5A, for converting digital data fed from the RAM 13 into appropriate dual tone frequencies necessary for actuating a phone connection.

The touch-tone frequency generator may, for example, be of the kind employed in the Pocket Data Terminal described on pages 30 and 31 of the January, 1976, issue of Radio Electronics and identified as TT 1001 in the circuit diagram appearing on page 30. It converts digital data received from the RAM into the 2-of-8 frequency code used in "Touch-Tone" telephone systems. The eight frequencies used in the code are obtained from the divider mode of prorammable dividers in the tone generator chip. The on-chip oscillator is crystal controlled and generates very stable frequencies with an accuracy of $\pm \frac{1}{2}\%$ which is well within the specifications of most "Touch-Tone" receivers including those used at the telephone companies main offices. Through a subroutine the processor outputs the necessary timing intervals and data from port A of PIA 11 to the audio system required by the touch-tone frequency generator in order that the required tones are emitted in proper sequence from the audio system. These subroutines are eight in number relating to the eight frequencies. The processor combines two subroutines to form each dual tone.

An example of the frequencies used in the touch-tone system is set out below in Table A.

TABLE A

| KEY | Touch-Tone Frequencies FREQUENCIES (HERTZ) |
|---|---|
| 1 | 697(L1) + 1209(H1) |
| 2 | 697(L1) + 1336(H2) |
| 3 | 697(L1) + 1477(H3) |
| 4 | 770(L2) + 1209(H1) |
| 5 | 770(L2) + 1336(H2) |
| 6 | 770(L2) + 1477(H3) |
| 7 | 852(L3) + 1209(H1) |
| 8 | 852(L3) + 1336(H2) |
| 9 | 852(L3) + 1477(H3) |
| 0 | 941(L4) + 1336(H2) |
| *("LIST") | 941(L4) + 1209(H1) |
| #("SPACE-CLEAR") | 941(L4) + 1477(H3) |

Figure 6:
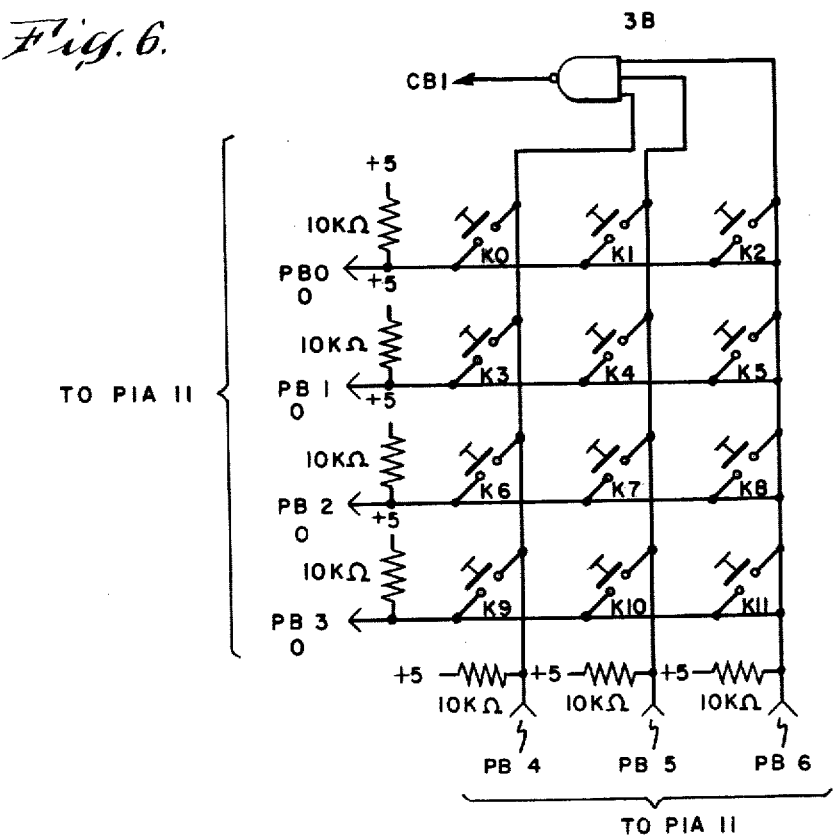
FIG. 6 is a circuit diagram of the keyboard.

As shown by way of example in FIG. 6, the circuitry of the twelve function keyboard 3 is of usual matrix configuration. The row lines of the matrix are connected to terminals PB0 through PB3 of PIA 11 while the column lines are connected to PB4 through PB6 terminals of PIA 11. The circuitry includes a startup unit 3A connected to the reset terminal of MPU 15 and also includes an interface circuit 3B connected to the CB1 terminal of PIA 11. As illustrated by way of example in FIG. 6, the interface circuit 3B comprises one NAND gate. The keyboard circuitry functions in usual manner as is well understood by those skilled in the art.

The connections of the circuitry will be further understood from Table B below identifying the terminals of the several components illustrated in FIG. 5.

TABLE B

| PIN NAME | DESCRIPTION | TYPE |
|---|---|---|
| A0-A15 | Address Bus Line | Tristate, output |
| $D^B0$-$D^B7$ | Data Bus Line | Tristate, bidirectional |
| Halt | Halt | Input |
| TSC | 3 State Control | Input |
| R/W | Read/Write | Tristate, output |
| VMA | Valid Memory Address | Output |
| DBE | Data Bus Enable | Tristate, output |
| BA | Bus Available | Output |
| IRQ | Interrupt Request | Input |
| IRQA, IRQB | Interrupt Request | Output |
| Reset | Reset | Input |
| $\phi 1\ \phi 2$ | Clock Signals | Input |
| $V_{ss}\ V_{cc}$ | Power, Ground | Input |
| E | Device Synchronization | Input |
| CB1 | Interrupt Input to Port B of PIA 1 | Input |
| CA1 | Interrupt control line | Input |

IRQ is an interrupt line. When it is signalled the MPU suspends whatever it is presently doing and services the device that has caused the interrupt. For example when a key is depressed the MPU will service the keyboard through PIA 11. This will happen if the MPU is not in a halt state. The RESET signal clears the contents of the MPU register when the CLEAR is pressed. When BA is low the MPU is now controlling the DATA BUS and ADDRESS BUS.

When the R/W is high, the MPU reads the data off of the DATA BUS and when low indicates that the MPU is outputting data onto the DATA BUS.

DBE identifies the portion of the machine cycle when the MPU is active at one end of the DATA BUS, when it is either transmitting or receiving data. The $\phi 1$ and $\phi 2$ signals from the CLOCK 15 are used to keep the digital system in accord. This also keeps time for the interval timer and allows the processor to function in a step-like process. For example in reviewing the keyboard an interrupt is acknowledged and then the unit scans the data on the PIA.

TSC is a 3-state control line which is an input to the processor and is used to control the address bus and read/write control output. This is used, for example, when the processor is addressing the RAM.

When the HALT input is low, the MPU ceases execution for example as an alternative through a loop in the system program. The +5 V input represents the power supply line for operating the processor. VSS and VCC are power and ground respectively.

The ADDRESS BUS is the means by which the processor can access various parts of the memory and the peripherals such as the display and the telephone signal converter 21. There are sixteen address lines for the MPU identified as A0–A15. When signals are placed on these lines the data, for example, located in the ROM, pertaining to that address location is accessed and placed on the DATA BUS. This allows the microcomputer, for example, to read the instructions located in the ROM or data in the RAM such as telephone numbers, etc.

The VMA signal is high whenever an address has been placed by means of the ADDRESS BUS such as an address to a RAM location.

CA2 is a bidirectional control connection of the audio system in port A of PIA 11 by means of which the audio system is controlled.

BC1 is a control connection between the keyboard and port B of PIA 12, and is used for the keyboard to request an interrupt of the MPU through the PIA.

The DATA BUS is made up of eight bidirectional lines that are used to transmit data between the MPU and the rest of the microcomputer. This is used when data in the RAM is to be transmitted to the MPU, for example a telephone number. The eight bidirectional lines of the DATA BUS are designated BD0–BD7. E is a synchronization line that allows all of the components to operate in accord.

OPERATION OF THE CIRCUITRY

Figure 7:
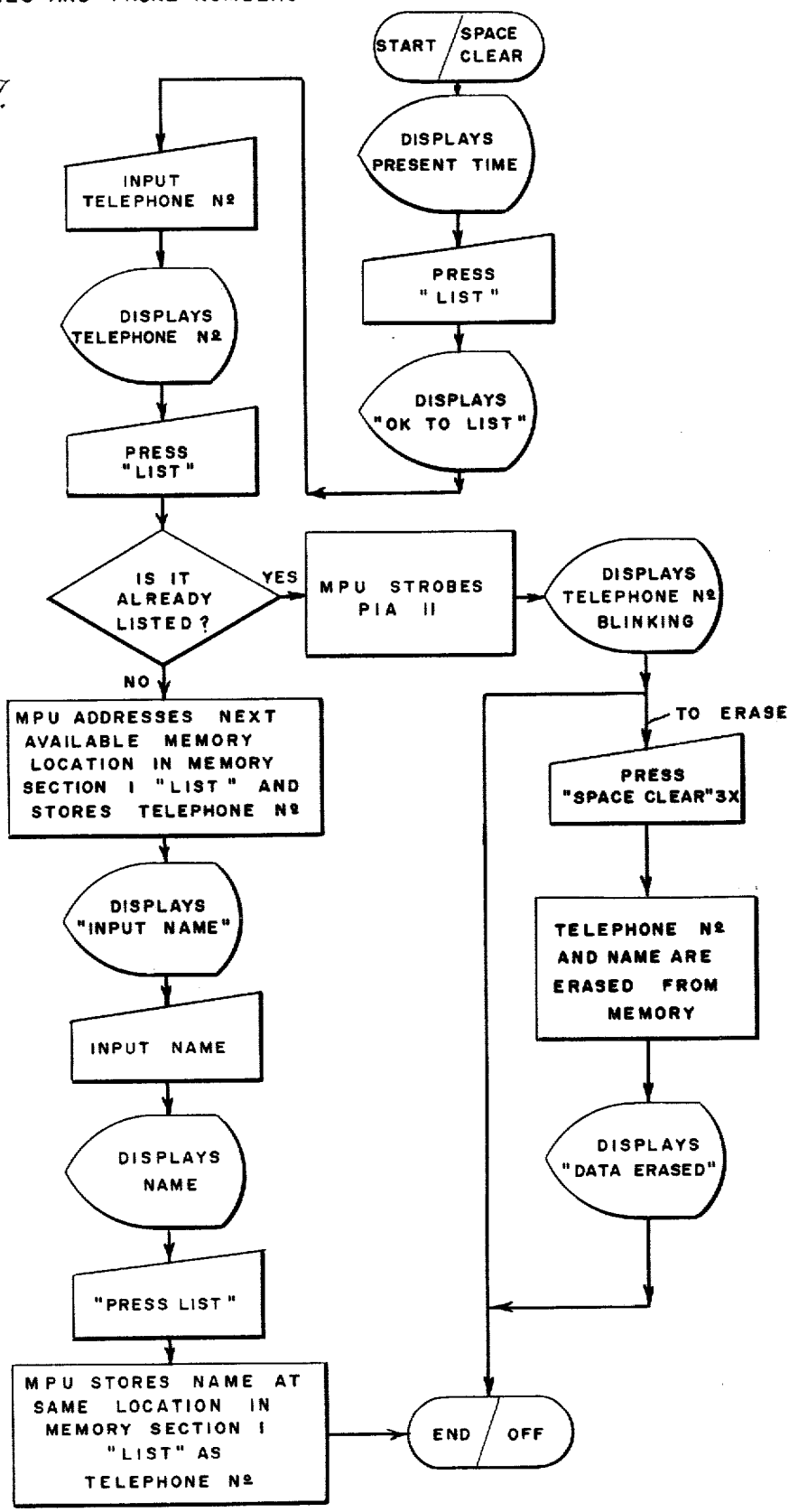
FIG. 7 is a flow chart illustrating the listing of names and telephone numbers.
Figure 8:
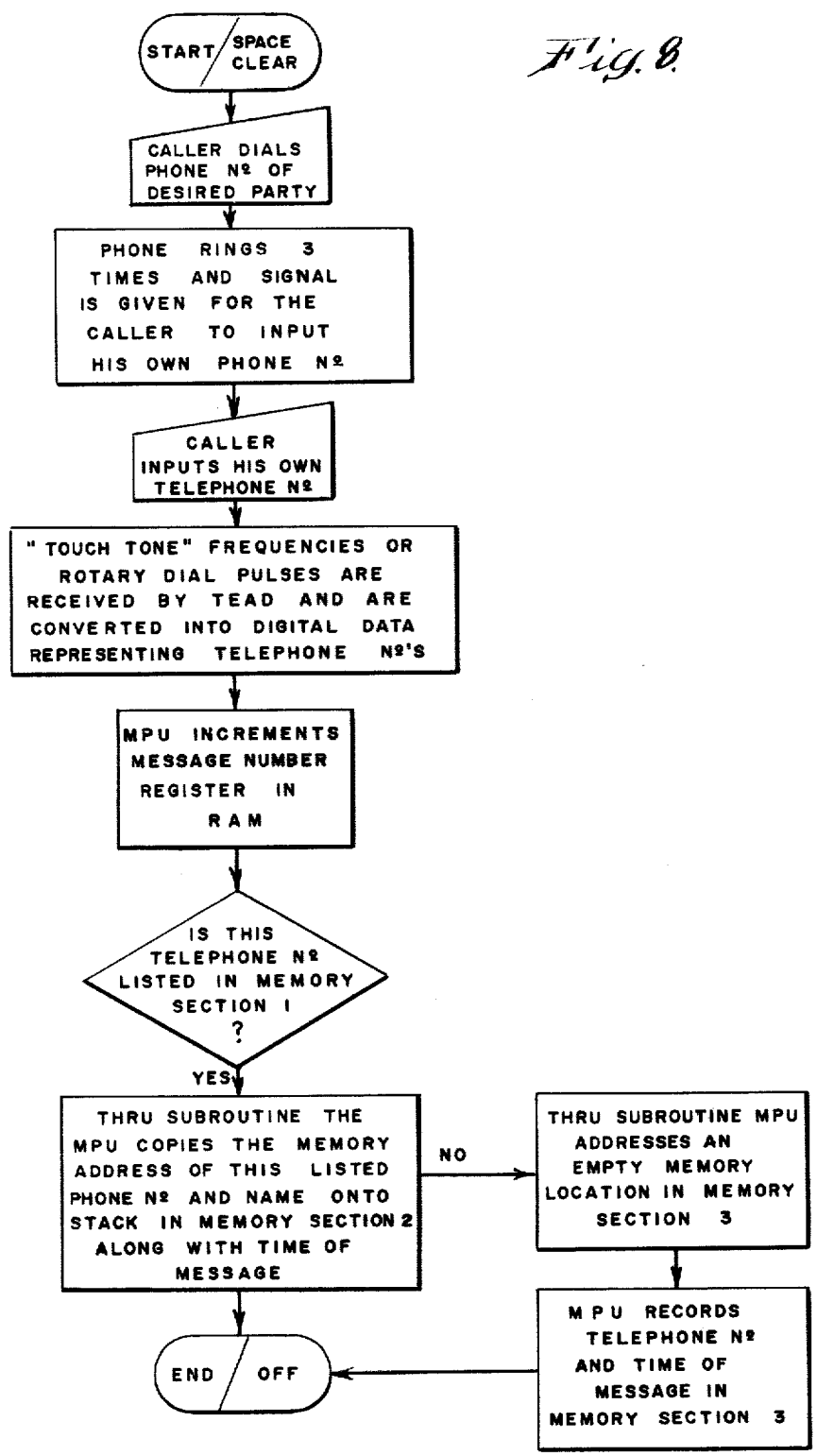
FIG. 8 is a flow chart illustrating the recording of messages.

The operation of the TEAD in accordance with the present invention will now be described with reference to the circuit diagrams and to the flow charts illustrated in FIGS. 7 through 9. It will be recognized that in the flow charts the several steps are coded by the shape of the blocks to identify user operations and machine functions.

"KEY INPUTTING"

When a key of the keyboard is depressed, a pulse is sent through CB1 as seen in FIG. 5 and fed to PIA 11 causing an interrupt and transmission of the keyboard data to the MPU. The MPU scans the PIA 11 and notes incoming data to the ports and thereby decodes which keys have been depressed. The keyboard is debounced internally with the help of data from the ROM which contains the system program. This data is inputted from the ROM through the ADDRESS BUS.

The MPU addresses the scratch memory (located in the RAM) through the ADDRESS BUS then outputs data to that memory address in the RAM through the DATA BUS and activates the write line (R/W). These memory locations in the RAM act as temporary storage localities for the data being inputted to the unit. The MPU now addresses PIA 12 through the ADDRESS BUS and inputs data to the PIA 12 through the DATA BUS. This causes the display 4 to display the required indicia by causing the correct display elements to be activated. Each of the displayed indicia is entered in the right-most portion of the display and shifted to the left upon entry of the next character. This process is continued until a function key is depressed. The MPU then performs the operation selected by the function key.

"KEY DEFINITION"

The inputting of a desired character or function is accomplished with the help of a look up table in the ROM telling the processor what each key or sequence of keys represents. This data from the ROM is inputted to the MPU through the DATA BUS 20 and is the code for that particular character or function. For example, when listing a person's name into memory the user must input the letters that spell out the person's name. As the alphanumeric keys on the keyboard have more than one letter on each keyface, the user defines the proper letter by depressing the key once to indicate the leftmost letter, twice to indicate the second letter and three times to indicate third letter. Accordingly, if the user wishes to input the name "BAYER" he depresses the key ABC(2) twice for "B", the key ABC(2) once for "A", the key YZ(0) once for "Y", the key DEF(3) twice for "E" and the key PQR(7) three times for "R". In a similar fashion, if the "SPACE-CLEAR" key is depressed once its function is defined as 'space' which is used to separate the first and last names of a person or the first three digits from the last four digits of a phone number. If the "SPACE-CLEAR" key is depressed twice its function is defined as 'clear' which is used to clear the display. If the "SPACE-CLEAR" key is depressed three times, its function is defined as 'erase' which is used to erase data from memory. Also when the display is off, the "SPACE-CLEAR" key turns the power onto the display and causes the present time to be displayed.

"LISTING NAMES AND PHONE NUMBERS"

The names and phone numbers of persons are listed, i.e. recorded, in memory by the user so that when a message is sent by a caller in accordance with the present invention, the microprocessor can access the memory location specified by the decoded phone number in order to look for the respective name. The user first depresses the "LIST" key. This instructs the microprocessor to enter the record mode. The telephone number of the person whom the caller wishes to list is then inputted via the keyboard 3 and is displayed in the display device 4. This inputted phone number is stored in the first available memory location in memory section 1, and is assigned a data index number which serves as the memory address, as the user depresses the "LIST" key again. He then inputs the name of the person whose telephone number he has just recorded. The microprocessor stores the name in the same location after the user depresses the "LIST" key again. After a phone number has been inputted by the user for listing, the MPU performs a routine specified by a program in the ROM. By this means the MPU determines if the memory location specified by the entered phone number has already been filled or if it is empty. The processor lets the user know if that address is already occupied, for example, by blinking the inputted telephone number by strobing the PIA 12. If the location is empty the unit proceeds with the above described recording procedure and the subsequent keyed in name is stored in the specified memory location in accordance with the record instructions. An example of telephone numbers and names listed in memory section 1 under data index codes is illustrated in Table C below. FIG. 7's flow chart illustrates by way of example the listing of phone numbers and names. The depression of the function key "LIST" (other function keys are "MESSAGES" and "SPACE-CLEAR" as shown in FIG. 1) causes the MPU to perform the operation "write" by activating the write line through the control bus.

The instruction is performed by recording data. The microcomputer addresses the data in the scratch pad memory and addresses the proper location in the RAM and then stores the data in that location.

The means by which the microcomputer addresses the memory location is through the ADDRESS BUS. The means by which the microcomputer transmits the data to the memory is through the DATA BUS. If the R/W line is activated for "read" the microcomputer will read data stored in the designated address. If the R/W line is activated for "write" the microcomputer will write data into the location addressed.

The display switches itself off automatically after twenty seconds of non-use by means of the clock circuit 16, interval timer 17 and a program in the ROM 14. When display 4 is off, power is still supplied to the RAM memory so that recorded data is not lost. Power is also continuously provided to the clock 16 and the interval timer 17.

"RECORDING MESSAGES"

The caller dials the phone number of the party he wishes to reach. After three rings, for example, the ring detector 22A of analogue telephone interface system 22 notes that three rings have been received and switches the tip and ring line onto an audio circuit which provides an audio signal from the micro-cassette player 22B indicating to the caller that he is to leave a message by transmitting and inputting his own phone number. A more detailed discussion of the operation of the analogue telephone interface system 22 is presented below.

The caller then inputs his own phone number either by depressing the keys on his push-button phone or by dialling his rotary dial phone. The signals generated by his dialling are sent through the telephone line to the TEAD unit interfaced to the user's phone on the other end of the line through the tip and ring line. The TEAD then decodes these received telephone signals by means of its telephone signal converter 21. If the signals received are touch-tone frequencies then the touch-tone frequency decoder 21A converts these dual tone frequencies into digital logic understandable by the microcomputer. If the signals received are in the form of rotary dial pulses, then the rotary dial pulse decoder 21B converts these pulses into proper digital form. A more detailed discussion of the operation of the telephone signal converter 21 is presented below. The MPU then performs a subroutine and compares the digital logic representation of the received phone number to the list of phone numbers and names stored previously by the user in memory section 1 of the RAM. The MPU carries out this routine by subtracting the received digital data from each of the listed phone numbers in memory section 1 until the number equals "0". By this means the MPU locates the correct memory location at which the person's name is stored. The MPU notes the data index code of this memory location and then addresses the next available memory location in memory section 2 and stores both this data index code as well as the present time, appearing in the accumulator, into stack memory of memory section 2. If during the MPU's compare routine it does not come up with an answer "0", this indicates that the phone number and name of the caller have not been listed in memory section 1 by the user and the MPU proceeds to address the next available memory location in memory section 3 and stores the digital data representing the received phone number along with the present time. FIG. 8's flow chart illustrates by way of example the recording of messages. Table D below illustrates by way of example data index codes, i.e. memory addresses of person's names and telephone numbers, stored along with times of received calls in memory section 2. Table E below illustrates by way of example telephone numbers and times of received calls stored in memory section 3. As illustrated in FIG. 8's flow chart the MPU keeps track of how many messages are received, by incrementing a 'message number register' in RAM each time touch-tone frequencies or rotary dial pulses are received.

"RETRIEVING MESSAGES"

The user first turns on the display by depressing the "SPACE-CLEAR" key and then depresses the "MESSAGES" key. The MPU then accesses the 'message number register' in RAM, reads the number of received messages and displays the number on the display device. The microprocessor then proceeds to address the first memory location in memory section 2 and read the data index code and stored time at that location. The microprocessor then addresses memory section 1 and searches for the same data index code and reads the telephone number and person's name from that location and displays this data along with the retrieved time of message on the display device 4. The user can thus read the name of the person who called, the person's phone number and the time of the call by depressing the "MESSAGES" key. After retrieving a message in such a manner the user continues to depress the "MESSAGES" key causing the microprocessor to sequentially address successive locations in memory section 2 and perform the above described routine and display further messages. After the microprocessor has sequentially addressed all the filled memory locations in memory section 2, it proceeds to address memory section 3 for data stored there. As this section has data stored of persons not listed in memory section 1, only the telephone number and time of message are displayed. The user continues to depress the "MESSAGES" key until "NO MESSAGES" is displayed indicating that there are no more filled memory locations in either sections 2 or 3.

FIG. 9's flow chart illustrates by way of example the retrieving of messages in accordance with this invention. When the user presses the "MESSAGES" key, the processor addresses the RAM through the ADDRESS BUS. The RAM logic outputs the data from that location onto the DATA BUS which is transmitted to the microprocessor and is inputted into the accumulator of the MPU. Then the MPU addresses PIA 12 and sends the data to PIA 12 in order for PIA 12 to cause the display 4 to be activated to display the contents of the accumulator.

In this way the unit displays the contents of the memory address. This process is continued to display successive data items as the "MESSAGES" key is repeatedly depressed.

TABLE C

| MEMORY SECTION 1 | | |
|---|---|---|
| DATA INDEX CODE | TELEPHONE NUMBER | PERSON'S NAME |
| 1 | 465-8355 | Luis Trilling |
| 2 | 678-2953 | Debra Lampeto |
| 3 | 276-6396 | MBI Corporation |
| 4 | 462-8000 | Ignatius Zapperman |
| 5 | 935-0539 | Issac Nounce |
| 6 | 383-3258 | Merna Alvarez |
| 7 | 473-6281 | Henrik Smithers |
| 8 | 531-1181 | Lori Chelows |
| 9 | 794-5063 | Rupert Brown |
| 10 | 265-7467 | William Hawthorns |
| 11 | 889-7024 | Mary Puegot |
| etc. | | |

In section 1 the MPU stores list of telephone numbers and names input by user.

TABLE D

| MEMORY SECTION 2 | |
|---|---|
| DATA INDEX CODE | TIME |
| 284 | 17:37 - 02/16/78 |
| 119 | 17:46 - 02/16/78 |
| 2 | 17:59 - 02/16/78 |
| 211 | 18:33 - 02/16/78 |
| 58 - 1 | 19:04 - 02/16/78 |
| 14 | 21:22 - 02/16/78 |
| 93 | 23:53 - 02/16/78 |
| 171 | 23:55 - 02/16/78 |
| 20 | 00:14 - 02/17/78 |
| 231 - 2 | 01:25 - 02/17/78 |
| etc. | |

In section 2 the MPU stores messages of persons by copying the data index code from memory section 1 that is indicated by received telephone number and records the time.

TABLE E

| MEMORY SECTION 3 | |
|---|---|
| TELEPHONE NUMBER | TIME |
| 875-3374 | 17:39 - 02/16/78 |
| 224-4197 - 2 | 21:46 - 02/16/78 |
| etc. | |

In section 3 the MPU stores messages of persons not listed in memory section 1 by recording their phone number and time.

TABLE F

| MEMORY SECTION 4 | |
|---|---|
| USER DEFINED KEY | DEFINITION |
| "1" | "Urgent" |
| "2" | "Returning your call" |
| etc. | |

In section 4 the MPU stores the definition of each "user defined key" as input and defined by user. "User defined keys" will be discussed hereinafter.

ANALOGUE TELEPHONE INTERFACE SYSTEM (ATIS)

Figure 5B:
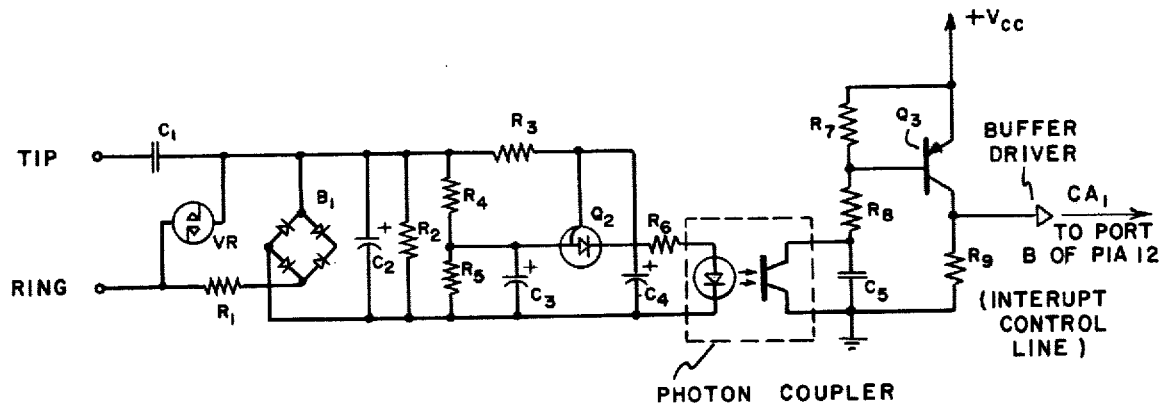
FIG. 5B is a schematic circuit diagram of one form of telephone ring detector which may be employed in FIG. 1.
Figure 5C:
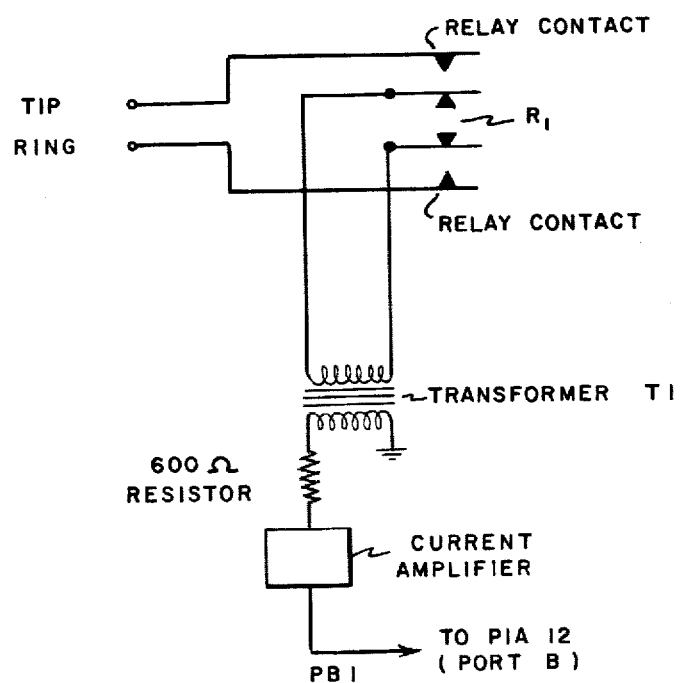
FIG. 5C is a circuit diagram of the line seizing relay which may be used in FIG. 1.

The ATIS 22 comprises the ring detector 22A, micro-cassette player 22B, line seizing relay circuit 22C and touch-tone frequency generator 22D as illustrated in FIG. 5A. Prior to the pickup of the telephone the on hook condition relay R1 isolates the tip and ring connection from the system transformer T1 as shown in FIG. 5C's illustration of the line seizing relay circuit 22C. T1 is a 600 ohms transformer with a barrier withstand voltage of 1500 volts AC with input an impedance of 20 Kohms. R1 is a relay with contacts capable of switching 1 amp DC at 24 volts. Ring detection is accomplished by means of an opto isolated digital output telephone ring detector as illustrated by way of example in FIG. 5B and as described in "Electronics Magazine" Nov. 25, 1976 issue page 112. In FIG. 5B, "Q" signifies transistor, "R" signifies resistor, "C" signifies capacitor, and "V" signifies varistor. The circuit outputs one digital pulse per each twenty HZ ring group. The incoming AC signal is rectified by bridge diodes B1. Capacitor C1 blocks the high voltage down the idle phone line. The R-C network composed of R2 equaling 10 K ohms and C2 equaling 10 micro F at twenty V, outputs a rough rectangular pulse. The programmable unijunction transistor Q2 (2N6027) triggers at gate voltage above 600 millivolts. The signal is then input into the photon coupler MCT-2 manufactured by Motorola which outputs a pulse that drives transistor Q3 (2N5227) that outputs the pulse to the buffer driver and then to the interrupt control line on the PIA 12's CA1. To answer the phone, i.e. to cause the "off hook" condition, the processor addresses PIA 12 and latches port B's PB1. This digital signal is then amplified and thereby energizes transformer T1 of the line seizing relay circuit 22C as illustrated in FIG. 5C which drives the relay contacts connecting a 600 ohm impedance to the tip and ring lines. The effect of this connection allows the telephone company equipment to cause the ringing telephone to become in an "off hook" state or answer mode. Once in this mode the system turns on a timed message which is composed of a conventional endless loop micro-cassette player 22B whose signal feed is input into the telephone line by means of a standard audio amplifier. The caller is thus instructed to send a message by inputting his phone number into his phone. The telephone signals thus generated and fed through the telephone line are received by the TEAD's telephone signal converter 21 and are decoded into binary form as described below.

"TELEPHONE SIGNAL CONVERSION"

Figure 5D:
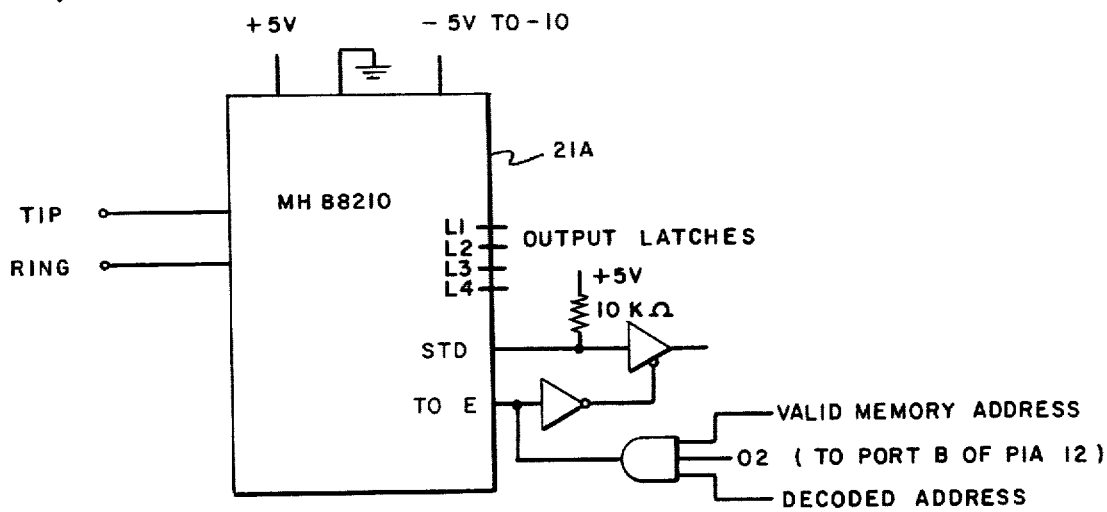
FIG. 5D is a circuit diagram of the touch-tone frequency decoder which may be used in FIG. 1.

The telephone signal converter 12 comprises the touch-tone frequency decoder 21A for decoding the dual tone frequencies received from a caller's phone through the tip and ring lines. An example of a converter that may be used is the MH88210 DTMF receiver system manufactured by Mitel Corp. of Kanata, Ottawa. The chip is designed to accept standard touch-tone dual frequencies. As illustrated by way of example in FIG. 5D and as described in the technical data sheet on the MH88210 published by Mitel, high and low frequencies are separated by means of band splitting filters and the circuit outputs a 2 of 8 active high code onto the data bus through port B of PIA 12 that represents the detected tone pair. A delayed strobe signal STD remains high for the duration of the detected tone pair and goes low after the release guard time has elapsed. Signal $\overline{STD}$ provides the inverse of these signals. The 3-state output enable TOE allows bussing of the data outputs. L1 through L4 are output latches. After the dual tones are converted into their digital phone number representations, this digital data is sent to the MPU 15 which then addresses the RAM 13 through the address bus 18. The telephone signal converter 21 also includes a rotary dial pulse decoder 21B for decoding rotary dial pulses. This decoder consists of an analogue to digital converter interfaced to port A of PIA 12 as shown in FIG. 5A. The message from micro-cassette player 22B instructs the caller to dial a "0", if his phone is rotary dial, before inputting his phone number. The dialling of the "0" allows the dial pulse decoder to calibrate its dial pulse sensing system for the quality of the particular telephone line connection and the particular characteristics of the dial mechanism in the phone used by the caller. The calibration is performed by digitizing samples of the wave form produced by the dialling of the "0". This digitizing is accomplished by means of the analogue to digital converter of the dial pulse converter 21B acting in conjunction with a program in the ROM. Once digitized the samples are analyzed by means of fast Fourier transforms. This allows the processor to discriminate between dial pulses and random clicks on the line generated by noise.

The sampling rate of analogue to digital conversion must be twice the maximum possible frequency of the dial pulses in order to eliminate the occurrence of aliasing. In the present invention the sampling rate is more than six times the maximum pulse frequency, i.e. approximately 130 samples per second in order that the discrimination of the dial pulses be reliable and as consistent as possible. It should be noted that the dial pulses sampled by the processor are audio signals that were generated as a bi-product of the making and breaking of contacts generated by the dialling. Therefore, the dial pulse audio signal is dependent on many variable characteristics and hence must calibrate at all times. This calibration is accomplished by means of producing a mathematical model representing a typical audio bi-product of a dial pulse and the delay between successive dial pulses for the particular current telephone configuration. The mathematical model is represented by means of a matrix of 8 bit words representing the amplitudes of the various points of the wave form. Each 8 bit word is a value between 0 and 255 corresponding to the digitizing of the wave form. The calibration is in the form of a mathematical model of a typical dial pulse and delay between dial pulses in a dial pulse group. This model is stored in memory and referred to by the pulse reading routine. The pulse reading routine digitizes the caller's dialled number and then mathematically compares the points in the typical calibration model with those digitized in order to distinguish the dial pulses and the delay between each dial pulse group. In this way the dial pulse decoder system 21B reads the dial pulses in each dial pulse group. The numbers representing each dial group is stored in sequential memory locations in binary form.

The requirement of the system is to recognize and count the number of dial pulses and the time delay between each dial pulse in order to determine the dialled number.

The system operates by performing the following functions: initiating the detection and calibration of the system; calibrating the system detection in order to determine the dial pulse variables; detecting and measuring the dial pulses and time delays; calculating the phone number from the inputted pulses and pulse delay times; and storing the calculated phone number in machine understandable form.

It should be noted that the dial pulses being detected by the instrument are acoustical by products of the make and break of the electro-mechanical contacts of the caller's telephone.

These acoustical signals are further electrically modified by the transmitting and multiplexing circuitry of the telephone switching network.

It should also be noted that the make and break dialling system of the subscriber's telephone is an electro-mechanical device that varies from system to system in the contact resistance, contact make delay and contact break delay due to variables such as precision in manufacturing, maker, age of the system, abuse, etc. and that the particular quality of the telephone connection (telephone switching network) varies from time due to many chance variables. Therefore, the proposed system must be able to detect dial pulses that vary in the a random fashion and be adjustable from one statistical variety of random dial pulse to another.

The initiation of the system begins by signaling the subscriber's phone to input a predetermined sample, say dialling the number "0" (which is 10 pulses). It then clears the computer registers and applys attention to the input port.

The calibration is accomplished by reading in the predetermined sample "0" by means of analogue to digital conversion and storing the sample in memory. This sample is then processed in order to separate out the 10 pulses. These signals are then measured individually in pulse width, amplitude and other characteristics. The greatest difference between each of them is measured and is recorded as the maximum typical difference.

The calibration is accomplished by means of the following.

The analogue signal is converted into a finite number of sample points each represented by a digital number from $-127$ to $+127$. Example: 0, 1, 2, 3, 5, 8, 12, 22, 29, 43, 59, 70, 91, 109, 119, 125, 127, 127, 216, 125, 123, 120, 115, 100, 89, 71, 61, 50, 40, 29, 12, 10, $-7$, $-11$, $-18$, $-20$, $-25$, $-29$ . . . .

These numbers represent points on the wave form corresponding to various voltage amplitudes on the wave form with respect to time.

Shown are row digital numbers corresponding to a section one arbitrary pulse.

It should be noted that this first loop is always higher in amplitude then any of the rest because of the build up of electrical inductance and capacitance while the circuit is in an idle state before being dialled.

The entire wave form once in digital form is then analyzed by the processor by breaking it up into 10 discrete ports. This is accomplished by mathematically analyzing the list of consecutive numbers and grouping them into 10 boundary groups each signifying a complete pulse. Also the delays between the pulses are measured and the maximum and minimum delay times are stored in memory.

Once the calibration procedure is completed, the system knows what a typical pulse looks like in terms of digital format.

When the number is dialled the system counts the pulses until a delay of greater than the maximum delay between pulses occur. At this point it totals the count until the delay and then represents it as one decimal digit corresponding to one digit of the phone number. This procedure is continued until the caller has completed inputting the dialled numbers.

"CLOCK TIME"

When the "SPACE-CLEAR" key is depressed the display is turned on and automatically displays the present time (the time of day, day of week, date, month and year). The interval timer 17 that is used to provide the system with timing interrupts that are under programming control allows the system also to keep real time. The interval timer is interfaced into the microprocessor through PIA 12. The time is continuously updated by the processor and stored in a dedicated memory address in the RAM. The microprocessor accesses the data from that memory location performing a logic operation on the data and transmits the data in suitable logic to PIA 12 in order to cause PIA 12 to display the present time. In this way the MPU can keep real time (time of day, month, date and year) with the help of a program stored in the ROM. There are many standard programs that are used to store time.

RETURNING MESSAGES

When the user wishes to return a call indicated by a particular displayed message, he lifts up the telephone handle off the phone hooks. This causes the standard "dial tone" signal to be outputted via the tip and ring line and fed to the analogue to digital converter 21B of the telephone signal converter 21. The A/D converter decodes the dial tone by converting the analogue signal into digital logic which is fed to the MPU through port A of PIA 12. This tells the MPU to instruct the TTFG 22D of AITS 22 to convert the phone number appearing in the display and found in the accumulator from binary form into the proper touch-tone frequency representations as illustrated in Table A. These dual tone frequencies are then output in proper order and with the appropriate spacing intervals controlled by the interval timer 17, clock 16 and a program in ROM 14 through the tip and ring telephone wires and telephone line so that a phone connection can be actuated in the usual manner.

ACCESSING MESSAGES BY PHONE

Messages stored in the TEAD can be accessed by telephone by using a second portable TEAD, which is hand held and not interfaced to a phone through the tip and ring wires and in which the same list of telephone numbers and names have been stored as in the user's home TEAD. The user first dials his own phone number and waits for the micro-cassette player to be switched on as described above and for the signal to be given that a message is to be left. He then dials a code, for instance "1—1—1—1" on the phone and the audio signal generated by his dialling is received by his "home" TEAD through the telephone line and converted by its telephone signal converter 21 into binary logic as discussed above. This particular logic instructs the microcomputer system of the "home" TEAD to feed out in rapid succession all the stored phone numbers from memory sections 2 and 3 of the RAM into the unit's TTFG 22D. The TTFG then converts these telephone numbers from binary form into the appropriate touch-tone frequency representations, as discussed above and outputs these frequencies through the tip and ring wires and telephone line to the phone the user is dialling from. The user places his hand held TEAD on the phone receiver and via audio pickup 21C of the telephone signal converter 21 the outputted touch-tone frequencies from the receiver of the phone are input to the unit and fed to its touch-tone frequency decoder 21A as illustrated in FIG. 5A. These frequencies are then converted back into binary form by the unit's decoder 21A, and fed through port A of PIA 12 to be stored in either memory sections 2 or 3 as explained above. In such a manner all the messages stored in the "home" TEAD are transferred via the telephone line to the second TEAD in rapid succession via rapid audio signal feed and stored in binary form in its RAM. This rapid audio signal feed is controlled by the interval timer 17 in conjunction with the clock 16 and a program in the ROM 14. The user then may press out his "MESSAGES" key at his own convenience and sequentially can access each individual message via the display 4 as described above.

USER DEFINED MESSAGES

The user can choose to define certain individual indicia on the telephone so as to allow the caller to indicate additional message material after inputting his phone number message. For instance, the user can program the "*" indicia to indicate "urgent" and the "#" indicia to indicate "returning your call". As rotary dial phones do not have these indicia and in order to also allow callers with such phones to leave additional message material the user may choose to program only numeric indicia such as "1" or "2" etc. for indicating additional message material, i.e. he may program "1" to indicate "urgent" and "2" to indicate "returning your call", etc. The user programs such indicia to indicate specific message information in the same manner that he programs the list of phone numbers and names into memory section 1 as discussed above. Instead of inputting a phone number and the name which it represents he inputs the "user defined key", for instance "1", and the message which it represents, for instance, "urgent". This information is stored in memory section 4 as illustrated by way of example in Table F.

Accordingly, the user stores such information by first depressing the "LIST" key on his TEAD thus placing the instrument into the record mode and then depresses the key he wishes to define, for instance the "1" key. Then he depresses the "LIST" key again and records the definition of the key by spelling out the word or words that constitute the definition by means of inputting the appropriate alphanumeric keys in the appropriate fashion as described above in the section: "LISTING NAMES AND PHONE NUMBERS". He then depresses the "LIST" key again. Thus, the MPU stores the "1" key in binary form into memory section 4 along with its definition in the same manner as it stores a telephone number and person's name into memory section 1. For each such key that the user defines and stores into memory section 4, he also audibly records that definition on the micro-cassette tape player 22B so that the caller can make use of that defined key. For example, the user would record: "please input your telephone number after the first beep and input '1' for 'urgent' and '2' for 'returning your call' after the second beep". It is necessary for the caller to wait for the second beep before inputting a "user defined key" so that the TEAD can understand that the generated signal is a user defined key to be decoded and stored in memory sections 2 or 3 along side the caller's data index code or phone number, and not mistake the received signal as a continuation of the inputted phone number.

Hence, when the caller depresses the "1" key after inputting his own phone number the MPU will store the binary form "1" along with the caller's data index code in memory section 2 as illustrated in Table D, or with the caller's telephone number in memory section 3 as illustrated in Table E.

The MPU accomplishes this by receiving the audio signal sent from the caller's telephone and decoding the touch-tone frequency or rotary dial pulse signal by means of its telephone signal converter 21 into binary form, and storing it in the appropriate memory section. When the user presses the "MESSAGES" key the MPU address memory sections 2 and 3 sequentially as described earlier. If the data index code or phone number is followed by a user defined key such as a "1" then the MPU will search in memory section 4 for the definition indicated by that key and display this information after displaying the person's phone number and/or name and time of message. Table F illustrates by way of example information stored under user defined keys in memory section 4. Tables D and E by way of example illustrate stored messages that include information indicated by user defined keys such as "1" and "2".

Since other modifications and changes varied to fit particular operating requirements and environments will be apparent to those skilled in the art, the invention is not considered limited to the examples chosen for purposes of illustration and covers all changes in modifications which do not constitute departures from the true spirit and scope of this invention.

What is claimed is:

1. A telephone electronic answering device (TEAD) coupled to a telephone line for automatically answering, storing and retrieving incoming telephone calls comprising:
   memory means in said TEAD for storing messages therein,
   means for the alphanumeric storage of a predetermined list of names and associated telephone numbers in said memory means,
   means for actuating said TEAD after a predetermined number of telephone ring signals thereby coupling said TEAD to a telephone line in order to answer an incoming call,
   means for transmitting a recorded message from said TEAD instructing the caller to dial his own telephone number,
   means in said TEAD for converting the caller's dialled telephone number into suitable form for storage,
   means for comparing the caller's telephone number with said predetermined list of names and associated telephone numbers stored in said memory means,
   means for storing the caller's name and number in said memory means when the caller's number appears on said list and storing only the caller's number when the caller's name does not appear on said predetermined list, and
   means for retrieving the messages stored in said memory means.

2. The telephone electronic answering device set forth in claim 1 having a keyboard with a plurality of alphanumeric and function keys for controlling the inputting and retrieval of information from said TEAD.

3. The telephone electronic answering device set forth in claim 2 in which said TEAD and said keyboard are incorporated in a telephone instrument, said keyboard performing the combined functions of dialling telephone numbers and controlling said TEAD.

4. The telephone electronic answering device set forth in claim 3 in which said keyboard contains a display means for visually displaying information inputted into and retrieved from said TEAD.

5. The telephone electronic answering device set forth in claim 4 including means for automatically dialling a displayed telephone number when said means is actuated by said keyboard by the user.

6. The telephone electronic answering device set forth in claims 2 or 3 including means for printing out a list of stored messages.

7. The telephone electronic answering device set forth in claims 2 or 3 including means for storing the time of incoming calls.

8. The telephone electronic answering device set forth in claims 2 or 3 including means for remotely actuating said TEAD for retrieving messages stored therein at a remote station.

9. The method of automatically answering, storing and retrieving incoming telephone calls with a telephone electronic answering device (TEAD) having a memory which is coupled to a telephone instrument comprising the steps of:
   storing a predetermined list of names and associated telephone numbers in said memory in said TEAD in digital form,
   actuating said TEAD after a predetermined number of telephone ringing signals,
   transmitting a recorded message to the caller instructing the caller to leave a message by dialling his own telephone number,
   converting the caller's dialled number into digital form,
   comparing said caller's dialled telephone number with said predetermined list and storing the caller's name and telephone number in said memory of said TEAD when the caller's dialled number appears in said predetermined list,
   storing said caller's telephone number in said memory when it does not appear in said predetermined list, and
   sequentially retrieving the messages stored in memory.

10. The method set forth in claim 9 in which the step of sequentially retrieving stored messages includes visually displaying the stored messages in sequence.

11. The method set forth in claim 10 including the step of returning a call by automatically dialling a displayed number on the command of the user.

12. The method set forth in claims 9 or 10 in which the step of sequentially retrieving the stored messages includes printing out the list of stored messages.

13. The method set forth in claim 9 including the step of storing the time of the received call in memory.

14. The method set forth in claim 9 in which the step of retrieving messages includes dialling the number of the telephone instrument having the TEAD attached thereto instructing the TEAD to transmit the stored messages in sequence, recording the transmitted messages on a remote TEAD, and retrieving the stored messages which have been transmitted to the remote TEAD.

15. A telephone electronic answering device (TEAD) coupled to a telephone line for automatically answering, storing and retrieving incoming calls comprising:

a microcomputer having a read only memory (ROM) for providing a program for said microcomputer, a random access memory (RAM) with a plurality of storage sections therein and peripheral interface means for coupling peripheral means to said microcomputer, a keyboard having a plurality of alphanumeric and function keys coupled to said microcomputer by said peripheral interface means, an alphanumeric display means mounted on said keyboard and coupled to said microcomputer by said peripheral interface means, said RAM having a predetermined list of phone numbers and names stored therein in a first memory section thereof, an analogue telephone interface system coupled between said telephone line and said microcomputer having a line seizing means for connecting said TEAD to said telephone line after a predetermined number of rings, and an audio recording for indicating audibly that the caller is to dial his own telephone number, a telephone signal converter means coupled between said telephone line and said microcomputer for converting a transmitted telephone number on the telephone line into digital form understandable by said microcomputer, said microcomputer comparing converted incoming telephone numbers with said list stored in said first memory section of said RAM, means for storing messages including a caller's telephone number and name in a second memory section of said RAM when the caller's transmitted telephone number corresponds to a telephone number previously stored in said first memory section, means for storing the caller's telephone number in a third memory section of said RAM when the caller's telephone is not on said predetermined list in said first memory section, and means for sequentially displaying said stored messages in said second and third memory sections of said RAM on said display means.

16. The telephone electronic answering device set forth in claim 15 in which said TEAD is incorporated in a telephone instrument.

17. The telephone electronic answering device set forth in claims 15 or 16 having a printer coupled by said peripheral interface means to said microcomputer for printing out said stored messages.

18. The telephone electronic answering device set forth in claims 15 or 16 having a telephone number generating means for converting telephone numbers stored in digital form in said RAM into transmitted telephone numbers, and means for actuating said telephone generating means for automatically dialling a stored telephone number appearing on said display means.

19. The telephone electronic answering device set forth in claims 15 or 16 having a timing means coupled by said peripheral interface means to said microcomputer and means for recording the time of each incoming call.

20. The telephone electronic answering device set forth in claims 15 or 16 including a fourth memory section in said RAM, means for storing predetermined definitions in said fourth memory section using a code formed by depressing certain combinations of keys on said keyboard, said audio recording indicating the code which must be used by a caller for each such definition in order for the callers to leave a message in the form of a storage definition.

* * * * *